United States Patent [19]

Daniels

[11] Patent Number: 5,080,345
[45] Date of Patent: Jan. 14, 1992

[54] REGISTRATION MECHANISM FOR SHEETS OF DIFFERENT SIZES

[75] Inventor: Steven D. Daniels, Churchville, N.Y.

[73] Assignee: Eastman Kodak Company, Rochester, N.Y.

[21] Appl. No.: 537,845

[22] Filed: Jun. 12, 1990

[51] Int. Cl.$^5$ .............................................. B65H 9/06
[52] U.S. Cl. .................................. 271/239; 271/248; 271/250
[58] Field of Search ............... 271/248, 250, 253, 3.1, 271/236, 241, 171, 223, 238–240

[56] References Cited

U.S. PATENT DOCUMENTS

| | | | |
|---|---|---|---|
| 1,833,027 | 11/1931 | L'Enfant | 271/248 |
| 2,756,113 | 7/1956 | Greenwood . | |
| 2,938,723 | 5/1960 | Paulson | 271/250 |
| 3,001,787 | 9/1961 | Socke . | |
| 3,206,042 | 9/1965 | Peterson . | |
| 3,588,090 | 6/1971 | Huston et al. | 271/240 |
| 4,211,399 | 7/1980 | McGowan | 271/239 |
| 4,245,831 | 1/1981 | Michatek | 271/171 |
| 4,538,801 | 9/1985 | Van Pelt | 271/251 |
| 4,637,602 | 1/1987 | Gavaghan et al. | 271/238 |
| 4,660,819 | 4/1987 | Allocco, Jr. et al. | 271/3.1 |
| 4,844,440 | 7/1989 | Gray | 271/236 |

FOREIGN PATENT DOCUMENTS

| | | | |
|---|---|---|---|
| 75745 | 4/1986 | Japan | 271/248 |
| 61-197362 | 9/1986 | Japan | 271/220 |

OTHER PUBLICATIONS

IBM Technical Disclosure Bulletin, vol. 19, No. 9, Feb. 1977, p. 3290—by W. E. Allen et al.

Primary Examiner—David H. Bollinger
Attorney, Agent, or Firm—G. Herman Childress

[57] ABSTRACT

A registration mechanism registers sheets of different sizes so the sheets are properly positioned as they enter an imaging station adjacent the mechanism. A fixed urging guide at one side of a platen urges sheets of the largest size toward a registration guide at another side of the platen for aligning the sheet relative to the guide. Other urging guides move through slots in the platen between a raised position relative to the platen, wherein they are effective to urge smaller sheets toward the registration guide, and a lowered position at or below the platen surface.

3 Claims, 2 Drawing Sheets

REGISTRATION MECHANISM FOR SHEETS OF DIFFERENT SIZES

CROSS-REFERENCE TO RELATED APPLICATIONS

This application is related to copending, commonly-assigned U.S. patent application Ser. No. 516,992, filed Apr. 30, 1990 in the names of Mark D. Bedzyk and Roger S. Brahm, and entitled "Film Sheet Registration Mechanism".

BACKGROUND OF THE INVENTION

The invention relates to a mechanism for registering sheets of different sizes relative to a station.

Sheet registration mechanisms of various kinds are known in the art. For example, U.S. Pat. No. 4,660,819, issued Apr. 28, 1987 in the names of C. Allocco et al, discloses a sheet registration device in a document handler of the kind used with electrographic copying apparatus wherein a set of document sheets are recirculated one or more times from the tray to a copying position and then returned to the tray. The handler of the patent has a tray surface on which sheets rest, and a sidewall or guide along one side edge of the tray surface terminates in an inclined ramp at the surface. A similar inclined ramp is provided on the other side of the tray. The two ramps are generally parallel to each other along opposite side edges of the tray. These ramps assist in registration of the document sheets in a corner of the tray prior to feeding of the sheets to the copying position.

Known sheet registration mechanisms may require a force other than gravity to be used for proper positioning of the sheet in the registration mechanism. In the above-mentioned patent, for example, an air knife provides a jet of air which assists in locating the sheet on the tray surface. Also known, registration mechanisms require delivery of sheets to the mechanism from only one side, and such can limit the use of the mechanisms to specific kinds of apparatus.

In the related patent application entitled "Film Sheet Registration Mechanism," referenced above, a mechanism registers a sheet of film and advances it toward an imaging station. A registration member is located along a surface that receives the sheet, and the member is engageable by an edge of the sheet for registering and guiding the sheet toward the station. An urging guide located along another portion of the surface is skewed relative to the registration member and spaced from it so that the end portions of the guide and registration member nearest the station are spaced apart sufficiently to enable the sheet to lie flat on the surface while other portions thereof are sufficiently close together to prevent the sheet from lying flat on the surface. The guide projects above the surface and is tilted away from the registration member so that the guide imparts a component of force onto a sheet resting thereon which urges the sheet toward the registration member. In order to accommodate sheets of various sizes, movable guides pivot between a lowered position wherein they are recessed in the surface of the platen, and a raised position above the surface. When in the raised position, the movable guides are parallel to the urging guide and enable smaller sheets to be urged toward the registration member, and when in the lowered position they are substantially in the plane of the platen.

SUMMARY OF THE INVENTION

It is an object of the invention to provide a sheet registration mechanism which utilizes the force of gravity for locating a side edge of sheets of various sizes in the registration mechanism. Another object of the invention is to provide such a sheet registration mechanism wherein movable guides are moved between raised and lowered in the same plane.

In accordance with the invention, a mechanism for registering sheets of different sizes relative to a station includes a surface for receiving a sheet, and a registration member located along the surface and extending toward the station for guiding the sheet toward the station. A first urging guide extends along the surface in spaced relation to the registration member. A second urging guide pivots between a position below and in alignment with a slot in the surface and a position wherein it projects through the slot and above the surface. When the movable guide is in its second position it is located between the first guide and the registration member.

The invention and its objects and advantages will become more apparent in the Detailed Description of the Invention presented below.

BRIEF DESCRIPTION OF THE DRAWINGS

In the Detailed Description of the Invention presented below, reference is made of the accompanying drawing, in which.

DETAILED DESCRIPTION OF THE INVENTION

Figure 1:
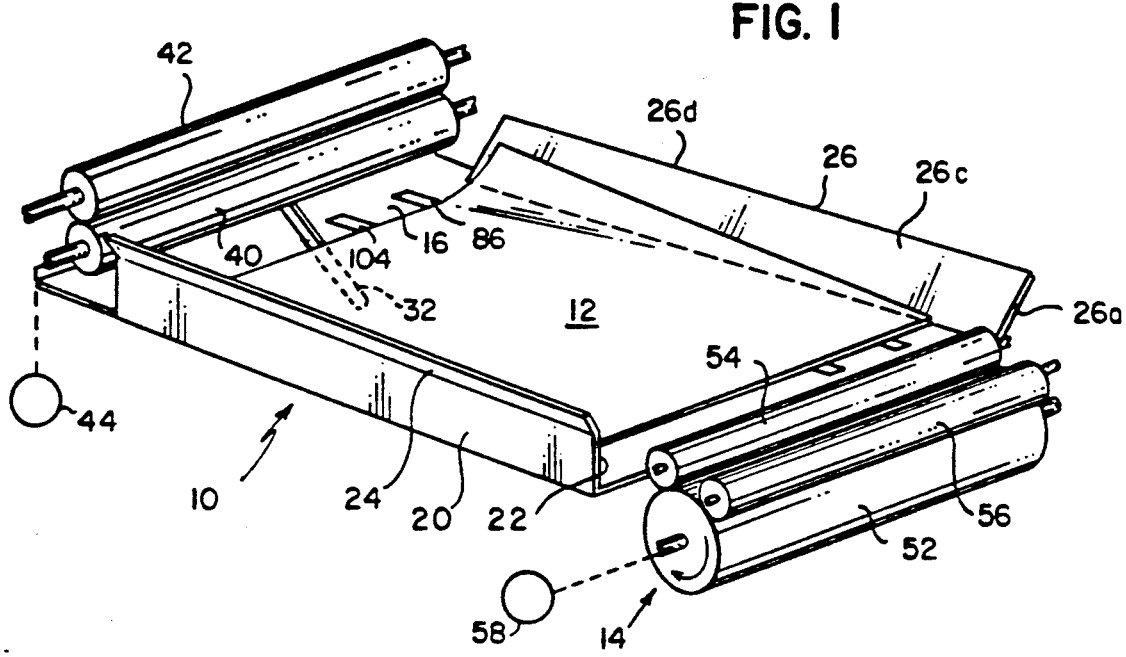
FIG. 1 is a perspective view of a film sheet registration mechanism of the present invention and showing a sheet on the mechanism.

A registration mechanism of the invention is generally designated 10. The mechanism receives a sheet 12 and registers the sheet before the sheet is advanced to a station, such as an imaging station 14. The sheet can be any of several different sizes, as explained later. The registration mechanism includes a platen 16 having a flat upper surface on which the sheet 12 is received. Preferably the surface of platen 16 is located in a substantially horizontal plane. Also, the platen is substantially rectangular in shape and slightly longer and wider than the dimensions of sheets 12 that are to be received by the registration mechanism.

A registration guide 20 is located along one side edge of the platen 16 and extends toward the station 14. Guide 20 has a vertical inner surface 22 that is substantially perpendicular to the upper surface of the platen 16. Sheets advanced along the platen engage surface 22 of the guide and are registered by this surface before entry into the station 14. Guide 20 has an upper edge portion 24 inclined outwardly away from the platen 16 so that a sheet being fed into the registration mechanism and which is offset from the desired location on the platen 16 will be deflected onto the platen.

A second guide 26 also extends along the upper surface of platen 16 and is effective to urge a sheet on platen 16 toward surface 22 of guide 20. Guide 26 is spaced from the registration guide 20 and also is skewed relative to the guide 20. Guide 26 can be skewed at an angle of about 2½ degrees, for example. Guide 26 is located so that the end 26a of the guide nearest to the station 14 is spaced a greater distance from surface 22 of the guide 20 than the end 26b of guide 26. The distance between end 26a of guide 26 and the surface 22 is related to the width of the sheet 12 to be registered and, more specifically, the distance between the end portions of guides 26 and 20 nearest the station 14 is sufficient to enable the portion of the sheet therebetween to lie flat on the upper surface of the platen 16 before entering station 14. On the other hand, the end portion 26b of guide 26 is close enough to the surface 22 to prevent the sheet from lying flat on the surface in this area of the mechanism. Thus, the portions of the sheet located on the left end portion of platen 16 as viewed in the drawings are supported by guide 26.

Urging guide 26 is not only skewed relative to the registration guide 20, but it is also tilted away from the surface 22 of the guide 20. Thus, the surface 26c of guide 26 which faces the surface 22 of guide 20 also faces upwardly and extends above the surface of the platen 16. By way of example, surface 26c can be inclined at an angle of about 105 degrees relative to the surface of platen 16. Due to the tilting of the guide 26, the upper edge 26d of guide 26 is further from the surface 22 of guide 20 than is the lower edge 26e of guide 26. When a film sheet is delivered to the registration mechanism gravity urges the sheet against guide 26 and the skewed and tilting arrangement of guide 26 causes the guide to impart a lateral component of force onto the sheet 12. This resulting force moves and then holds the side edge of the film sheet against the surface 22 of the registration guide 20 to register the sheet for delivering to station 14. In addition, the spacing between the end 26a of the guide and the surface 22 enables the leading edge portion of the sheet to lie flat on the surface of the platen 16 prior to the time it enters the station 14.

Means are provided for moving a sheet 12 toward station 14. More specifically, the moving means illustrated in the drawings comprises a pusher cog 30 which projects upwardly through a slot 32 in platen 16 by a distance sufficient to engage the trailing edge of the sheet 12 on the platen. Slot 32 extends from a position adjacent the left edge of the platen toward station 14 by a distance that will permit movement of the leading edge of a sheet into a drive at station 14. Slot 32 is inclined toward the surface 22 of guide 20. By way of example, the slot 32 can be inclined at an angle of about 13° with respect to the guide surface 22.

The slot and cog are located relative to the length of the sheet 12 and relative to station 14 so that when the leading edge of the sheet reaches station 14 the cog is in engagement with the central portion of the trailing edge of sheet 12. For example, for sheets 11″ wide cog 30 can be about 6″-7″ from guide 20 when the cog is in its FIG. 2 position and about 5″-6″ from guide 20 when the leading edge of the sheet reaches station 14. The slot can be parallel to surface 22 if sheets of only one width are to be handled, but preferably is inclined when sheets of a plurality of widths are to be handled, as described later.

Figure 2:
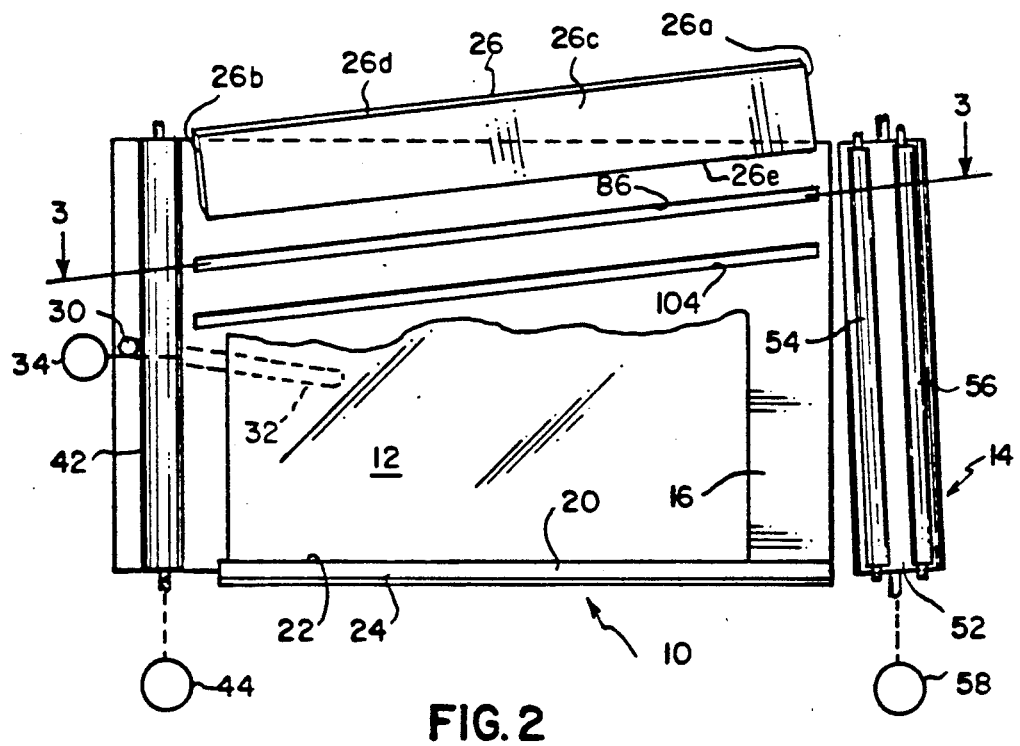
FIG. 2 is a plan view of the registration mechanism shown in FIG. 1, with the sheet being partially broken away.

The pusher rod is driven toward and away from the station by a drive mechanism, shown diagrammatically at 34 in FIG. 2. For example, the drive 34 can comprise a belt under platen 16 that is attached to the cog 30 with the belt being trained around a pair or rollers and driven by a reversible motor so that the cog is moved first toward the station 14 and then away from the station under control of a suitable machine control mechanism.

Sheets can be delivered to the platen 16 of the registration mechanism in any suitable manner. By way of example, FIGS. 1 and 2 illustrate a pair of entrance feed rollers 40,42 located adjacent the end of the platen 16 opposite from the station 14. One of these feed rollers, such as roller 40, can be driven from a suitable drive mechanism shown schematically at 44 in FIG. 1. The nip between rollers 40,42 is elevated above the surface of platen 16 and edge 26d of guide 26 so that sheets fed to the platen by the rollers pass over the cog 30 when it is in its retracted position and over guide edge 26d.

Station 14 as illustrated in the drawings comprises a scanning station where an image can be formed on a sheet 12 of unexposed film such as x-ray film. Station 14 includes a scan drum or roller 52 and a pair of pinch/exit rollers 54,56. Roller 52 is driven from a suitable drive mechanism shown diagrammatically at 58 in FIG. 1. Rollers 54,56 both contact the surface of roller 52. Rollers 54,56 are spaced from each other and are effective to hold the portion of a sheet 12 located between the nips formed by rollers 52,54 and rollers 52,56 firmly against the surface of the larger roller 52. The image to be formed on the sheet can be projected onto the film through the narrow space between rollers 54,56.

A sheet of film 12 to be registered and delivered to station 14 is fed to the registration mechanism 10 by feed rollers 40,42. The sheet is delivered onto the platen 16 with the trailing edge thereof spaced from cog 30 and with the leading edge thereof spaced from the station 14. The force of gravity pulls the sheet toward the surface of platen 16 and against the skewed, tilted surface 26c of guide 26 which produces a lateral component of force that urges the sheet toward the surface 22 of the registration guide. Then the cog 30 is driven to the right as viewed in FIGS. 1-3 and toward the guide 22, thereby urging the sheet toward guide 22 and simultaneously moving it into the station 14.

As the leading edge of the sheet enters station 14 it enters the nip between rollers 52,54 and then the nip between rollers 52,56. The rollers 52,54 and 56 drive the sheet at a velocity that exceeds the velocity imparted to the sheet by cog 30 so that the sheet is pulled away from the cog and is controlled entirely by the rollers 52,54 and 56 as it moves through station 14. This enables scanning of the sheet film to take place with no influence from the cog 30.

A film sheet registration mechanism as described above is disclosed in the related patent application Ser. No. 516,992 mentioned previously. As recognized in such application, at times it is desirable to use such a registration mechanism for feeding film sheets of widely different dimensions to a station 14. For example, sheets of x-ray film are commonly available in sizes of 8×10 inches, 11×14 inches, 14×14 inches and 14×17 inches. When the registration mechanism is to handle film sheets of such widely varying dimensions, the urging guide 26 is spaced from surface 22 of the registration guide by a distance such that it is capable of handling the widest sheet to be accommodated on the registration mechanism, such as sheets 14″ wide. For smaller sheets, such related patent application discloses additional urging guides which pivot between a lowered position in recesses in the platen and raised positions above the platen surface and parallel to the guide 26 wherein they can handle smaller sheets. In accordance with the present invention, an improved mechanism is provided for handling sheets of different sizes.

Figure 3:
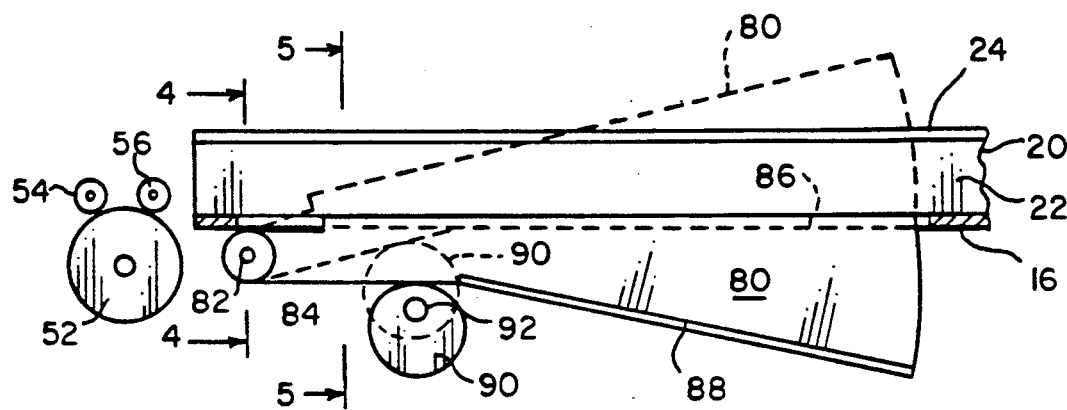
FIG. 3 is a cross-section view taken along line 3—3 of FIG. 2.
Figure 4:
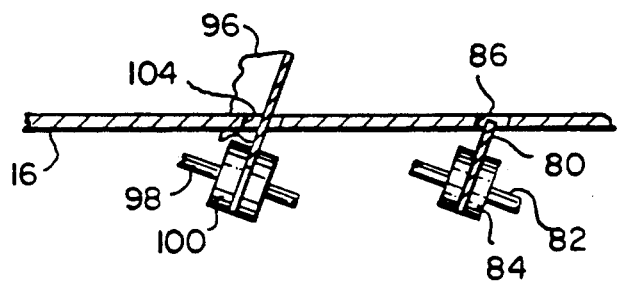
FIG. 4 is a fragmentary cross-section view taken along line 4—4 of FIG. 3.
Figure 5:
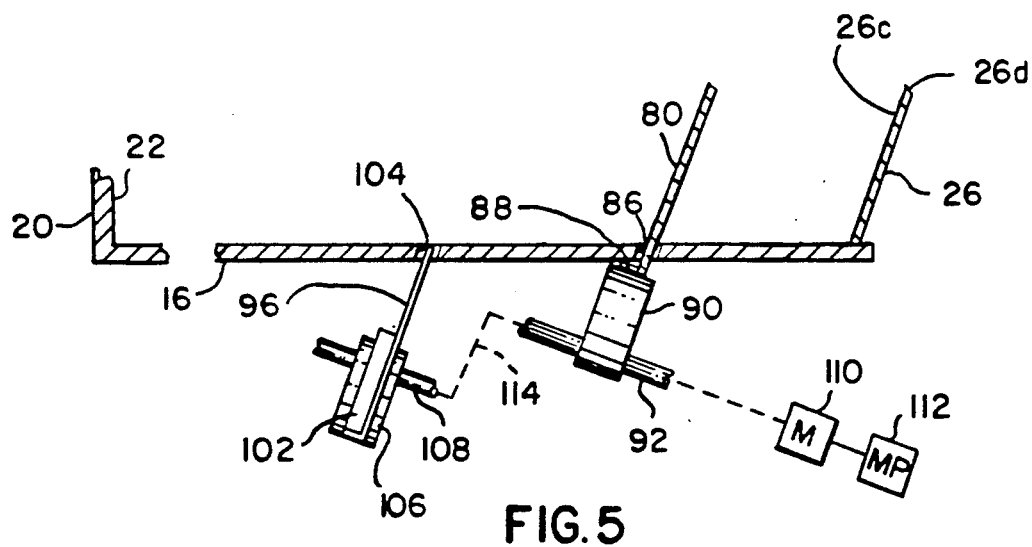
FIG. 5 is a fragmentary cross-section view taken along line 5—5 of FIG. 3.

Referring now to FIGS. 3-5, a second urging guide 80 is provided for accommodating sheets of a narrower width than the widest sheets to be handled by the mechanism. More specifically, for the range of sizes mentioned above, urging guide 80 is designed for handling sheets that are 11 inches wide. Guide 80 is mounted on a pivot 82 by a bearing 84. Pivot 82 is located beneath the platen 16 and its axis is inclined at an acute angle with respect to the upper surface of the platen. Guide 80 is located in a plane perpendicular to the axis of the pivot 82, and it is in a plane that is parallel to the plane of the fixed urging guide 26 as illustrated in FIG. 5. A slot 86 extends through platen 16 in the plane of the guide 80 so that the guide can be moved upwardly and downwardly through slot 86. Preferably, the guide 80 has a lip 88 that extends along a portion of its lower edge and is adapted to engage the bottom surface of platen 16 to limit upward movement of the guide relative to the platen.

Guide 80 can be raised and lowered by a cam 90 located beneath the guide and eccentrically mounted on a shaft 92. Shaft 92 and cam 90 are located with respect to the guide so that the cam lies in the plane of the guide. When cam 90 is positioned as shown in solid lines in FIG. 3, the force of gravity urges the guide 80 downwardly into engagement with the cam. In this position the cam locates the upper edge of the guide in a plane at or just below the upper surface of the platen 16, as shown in FIG. 4. When the cam is rotated 180° from its solid line position to the position shown in phantom in FIG. 3, the guide is driven upwardly to its raised position shown in phantom in FIG. 3 and in solid lines in FIG. 5. When guide 80 is in its raised position it is substantially parallel to guide 26 and located between guide 26 and the surface 22 of registration guide 20. In this position it is able to urge sheets of an intermediate size toward surface 22 in the same manner explained hereinbefore with respect to guide 26.

In a similar manner, a third urging guide 96 is mounted on a pivot 98 by a bearing 100. Pivot 98 and guide 96 are inclined with respect to the upper surface of platen 16 so that the guide 96 is held in a plane substantially parallel to guides 26 and 80. Guide 96 also has a lip 102 (FIG. 5) along its lower edge which is adapted to limit upward movement of the guide 96 by engaging the lower surface of platen 16. Guide 96 moves upwardly and downwardly relative to the platen through a slot 104 between a lowered position shown in FIG. 5 where the upper edge of the guide is located at or just below the plane of the upper surface of platen 16, and an elevated position, shown in FIG. 4, where the guide projects upwardly above the upper surface of platen 16.

Guide 96 can be moved between its lowered and raised positions by a cam 106 mounted on a shaft 108. The cam is located in the same plane as the guide 96. Cam 106 is similar to cam 90 described previously. Thus, rotation of the cam 106 from its FIG. 5 position where guide 96 is in its lowered position is affective to raise the guide to a raised or elevated position, shown in FIG. 4, where guide 96 is parallel to guides 26 and 80. In its raised position it is effective to urge smaller sheets (e.g., 8" wide sheets) toward surface 22 of registration guide 20 as explained hereinbefore with respect to guide 26.

Preferably, the shafts 92,108 are driven from a single motor 110 under control of a suitable control system, such as a microprocessor 112. Also, shafts 92 and 108 can be coupled together as shown diagrammatically at 114 by, for example, gears (not shown). Preferably the microprocessor 112 controls motor 110 so that shafts 92,108 are rotated synchronously to achieve sequential positioning of the guides 80,96 in raised or lowered positions, or to locate both guides in the lowered position. Thus, by locating cams 90,106 at a predetermined position about the axis of shafts 92,108, guide 80 can be raised while guide 96 is lowered, as shown in FIG. 5, or by rotating the shafts the guide 80 can be lowered and guide 96 elevated, or both guides 80 and 96 can be lowered. This permits three different sizes of sheets to be readily accommodated by the registration mechanism of the invention. Additional sheet sizes also could be handled by the registration mechanism by adding other movable guides similar to those shown at 80 and 96.

A number of advantages are achieved by the registration mechanism of the invention. The mechanism can handle films of various dimensions by selectively using any one of the urging guides 26, 80 or 96 to urge the sheets toward the surface 22 of guide 20. Because the movable guides 80,96 are always in their respective planes whether they are lowered or raised, the guides are always properly located in the correct plane generally parallel to guide 26 when they are raised. Also, the microprocessor 112 can control operation of the motor 110 to raise or lower the guides in a simple yet positive and effective manner. A sensor (not shown) could detect the size of sheet being delivered to the registration mechanism and provide a signal to the microprocessor 112 to automatically position the movable guides 80,96 to their respective raised or lowered positions, depending upon the size of sheet sensed.

The invention has been described in detail with particular reference to a preferred embodiment thereof, but it will be understood that variations and modifications can be effected within the spirit and scope of the invention.

I claim:

1. In a mechanism for registering sheets of different sizes relative to a station, the registration mechanism having a surface for receiving a sheet with the sheet being movable along the surface toward the station, a registration member located along the surface and extending toward the station, the member being engageable by the sheet for guiding the sheet toward the station, and a first urging guide extending along the surface in spaced relation to the registration member, the guide having one end spaced from the member by a distance sufficient to enable a sheet of a first size that is to be registered to lie flat on the surface between the one end portion of the guide and the member, and the guide having a second end portion that is sufficiently close to the member to prevent the sheet from lying flat on the surface between the second end portion and the member, the guide projecting above the surface and being tilted away from the member so that gravity pulls the sheet against the second end portion of the guide and imparts a component of force onto the sheet urging the sheet toward the registration member to register the sheet, the improvement comprising:

an elongated slot in the surface parallel to the urging guide and located between the registration member and the urging guide;

a second urging guide mounted beneath the surface for pivotal movement between (1) a first position wherein the second guide is aligned with the slot and below the surface, and (2) a second position wherein the second guide projects through the slot and above the surface, the second guide being located in a plane spaced from and parallel to the plane of the first guide, and the second guide when in its second position being located between the first guide and the registration member so that a sheet of a second size and smaller than the first size can be registered by the second guide, and means for moving the second guide between its first position and its second position.

2. In a mechanism as set forth in claim 1, wherein the means for moving the second guide comprises a cam rotatably mounted beneath the surface and operatively associated with the second guide so that rotation of the cam is effective to pivot the second guide between its first position to its second position.

3. In a registration mechanism as set forth in claim 1, further comprising a second elongated slot in the surface between the registration member and the urging guide, a third urging guide mounted beneath the surface for pivotal movement between (1) a first position wherein the third guide is aligned with the second slot and below the surface, and (2) a second position wherein the third guide projects through the second slot and above the surface, the third guide being located in a plane spaced from and parallel to the first guide, the third guide when in its second position being located between the second guide and the registration member so that a sheet of a third size and smaller than the second size can be registered by the third guide, and means for controlling movement of the second and third urging guides so that (1) the second guide can be in its second position, or (2) the third guide can be in its second position, or (3) both the second and third guides can be in their respective first positions, so that sheets of three different dimensions can be registered by the mechanism.

* * * * *